Aug. 8, 1967　　　SHIZUO HARADA　　　3,334,883
METALLURGICAL FURNACE
Filed July 16, 1964
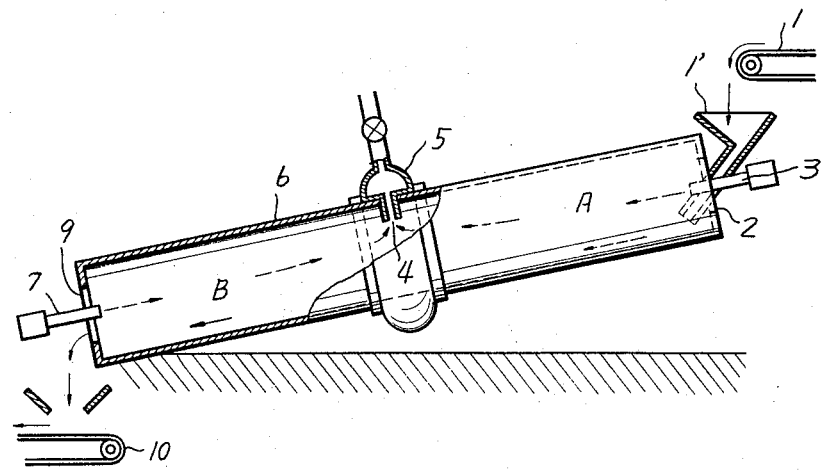

United States Patent Office 3,334,883
Patented Aug. 8, 1967

3,334,883
METALLURGICAL FURNACE
Shizuo Harada, Chiba-shi, Chiba-ken, Japan, assignor to Kawasaki Steel Corporation, Hyogo-ken, Japan, a corporation of Japan
Filed July 16, 1964, Ser. No. 383,171
Claims priority, application Japan, Aug. 20, 1963, 38/44,431
2 Claims. (Cl. 266—20)

This invention relates to a novel metallurgical furnace in which ores, particularly iron ores, in the form of lump ores, fine ores, sintered ores, or green pellets, are subjected to metallurgical processes such as drying, roasting, indurating or smelting.

In the prior art counter flow blast furnaces the charge passes downward from the top of the furnace to the hearth thereof while the hot gases flow upward from the hearth to the top of the furnace. The upward flow of gases necessitates a complicated gas sealing device, such as a double bell and hopper closing off the top. Besides the expense of such sealing means, the seal prevents direct inspection of the charge within the furnace, resulting in poor quality control.

The prior art counter flow furnaces, furthermore, are designed to use the hot counter flow gases for metallurgical treatment. While the temperature of these gases might be sufficient for a relatively dry charge, it is insufficient for a charge of moist ores or wet green pellets. To obtain a satisfactory preheating temperature in a moist charge, the material in the roasting region near the discharge area would be overheated resulting in reoxidation of the material as it emerges from the furnace. Since the heat transfer rate between a gas and a solid is proportional to the fourth power of the temperature difference between them it has been impossible to effect an efficient exchange of heat between the charge and the hot gas when there is a large temperature gradient.

Another problem often incurred in counter flow furnaces is that the counter flow gases must be driven up the furnace by a powerful blower. This results in high velocity gases having high friction losses. These gases also tend to pick up any small pieces of material or dust. This makes it virtually impossible to charge the furnace with very finely divided material.

Therefore, it is an object of the invention to provide a furnace having a negative gauge pressure exhaust line intermediate the ends of said furnace and a separate preheater supplying gas at the required temperature adjacent the charging end of said furnace.

It is another object of the invention to provide a furnace in which ores in the form of lump ores, fine ores, sintered ores, or green pellets, are subjected to metallurgical processes such as drying, roasting, indurating or smelting.

Another object of the invention is to provide a furnace having suitable preheating means for wet ores, green pellets or pyrolyzable ores.

Still another object of the invention is to provide a furnace in which the counter flow gas has such a low velocity that it will not pick up dust and fines.

A further object of the invention is to provide a simple furnace with its charging end free of encumbering seals and excessive heat.

A still further object of the invention is to provide a furnace in which the charge can be visually inspected during the operation of the furnace.

Other objects and advantages of the invention will be apparent from the accompanying drawings and description.

In the drawings:
The figure is a cross-sectional schematic view of a rotary kiln or furnace illustrating the flow pattern of the charge and gases.

An embodiment of the invention is shown in the figure which illustrates a rotary furnace, which is mounted at an angle on a stationary base (not shown) for slow rotation. The furnace, designed for continuous operation, consists of a furnace body 6 lined with a refractory material and formed into a preheating zone A and a counter flow zone B. The furnace body 6 is formed at the upper end with a charging hole 2 and, at the lower end, with a discharge hole 9. At the charging hole 2 is a funnel shaped hopper 1' thereof being located under the overhanging end of a conveyor 1 for continuously dispensing a charge into the upper end of the furnace body 6. A second conveyor 10 is mounted below the discharge hole 9 for carrying the processed charge continuously away from the furnace. Fixedly mounted at the charging hole 2 and extending axially into zone A of the furnace is a preheating burner 3. Extending axially through the discharge hole into zone B is a main burner 7. At the center of the furnace body 6, between zones A and B, is a waste gas outlet 4 connected to a vacuum pump or fan (not shown) by a stationary manifold 5 surrounding the furnace and mounted thereon by a gas tight seal, permitting relative rotary motion.

The flow diagram in the figure illustrates the pattern of flow of the charge and the gases. The charge moves through the furnace body 6, as shown by the solid line arrows, from the conveyor 1, into the hopper 1', travels along the length of the furnace body 6 through zones A and B and discharges through the discharge hole 9 onto the conveyor 10. The broken arrows illustrate the flow of gases driven counter to the charge, entering through the burner 7 at the discharge hole 9 and, travelling through zone B, and drawn out at the waste gas port 4. The preheating gases are introduced through the burner 3, travel through the preheating zone A with the charge, and are also drawn out at the waste gas port 4.

An example is described in which "luppe" (metallic iron nodules) is obtained from ferruginous sand subjected to smelting in the rotary furnace as shown in the figure.

*Rotary furnace*

Length:
    The length between charge end and waste gas outlet—
        Drying and preheating zone _____m__ 5
    The length between waste gas outlet and discharge end—
        Reducing zone _____m__ 15
        Luppe zone _____m__ 5

Total length _____m__ 25

Inside diameter _____m__ 1.8
Inclination _____percent__ 2
Revolution _____r.p.m.__ 1
Production:
    Luppe (Fe 95%) _____tons/hr__ 1.0
    Magnetic concentrate (Fe 80%) _____do____ 0.25
    Slag _____do____ 0.7
Charge (per 1 ton/hr. of luppe):
    Ferruginous sand (Fe 49.2%) _____tons__ 2.2
    Coke breeze _____do____ 0.15
    Anthracite _____do____ 0.42
    Magnetic concentrate _____do____ 0.2

Fuel (heavy oil):
- Charge end burner _____ l./hr__ 40
- Discharge end burner _____ l./hr__ 100

Operating temperature:
- Luppe zone _____ ° C__ 1250–1300
- Reducing zone _____ ° C__ 600–1250
- Preheating zone _____ ° C__ 200–400
- Waste gas _____ ° C__ 200

In furnaces, of the type illustrated in the drawings and discussed above, the charging end needs no gas seal and may be kept open to allow visual observation of the interior. Since the central exhaust ports tend to draw the injected gases from both directions, the main heating gases and the preheating gases are able to flow in opposite directions. There is no tendency for the gases to issue forth at the charging end, allowing the charging port to be kept at a reasonably low temperature.

The installation of separate preheating and counter flow gas supplies permits the temperatures and gas velocities at both ends of the furnace to be separately adjusted for ordinary dry charges or moist ores and wet green pellets. The gas velocities also can be lower due to the shorter distance to be transversed and may be adjusted to handle finely divided materials without flying dust or fines.

As fully described in the foregoing, by the application of the principles of this invention to metallurgical furnaces of various types, the cost of construction of furnaces will be reduced along with increased operating efficiency and easier maintainance and repair.

It will be apparent that various changes may be made in the form, construction and arrangements without departing from the scope of the invention, the forms herein described being merely two preferred embodiments thereof.

I claim:

1. A tilted rotary furnace for processing a metallurgical charge, said metallurgical charge moving through said furnace in first direction from a first end portion of said furnace to second end portion of said furnace, means for supplying counter flow gases at the second end of said furnace for chemically processing said charge, said gas flowing in a stream in a direction opposite to the direction of flow of said charge, means for supplying preheating gases at the first end of said furnace, said preheating gases travelling in the direction of said charge, and means for expelling the waste gases resulting from the above-mentioned process, said last-mentioned means being arranged at the intermediate position of said furnace, said first end of said furnace being open at its top portion whereby visual inspection of the furnace interior is permitted.

2. A furnace as recited in claim 1 wherein there are separate means for adjusting the temperatures of said preheating and said counter flow gases whereby the separate temperatures of said preheating and said counter flow gases may be set to efficiently process dry or wet charges.

References Cited

UNITED STATES PATENTS

| | | | |
|---|---|---|---|
| 2,793,946 | 5/1957 | Paschal | 75—41 |
| 2,806,776 | 9/1957 | Veale et al. | 75—5 |
| 2,837,419 | 6/1958 | Sellers et al. | 75—41 |
| 2,900,236 | 8/1959 | Speed et al. | 75—33 |
| 3,113,859 | 10/1963 | Moklebust | 75—33 |
| 3,148,973 | 9/1964 | Holowaty et al. | 75—41 |

BENJAMIN HENKIN, *Primary Examiner.*

DAVID L. RECK, *Examiner.*